3,166,866
HOLDER FOR ARTIFICIAL FLIES
Desmond H. Norton, 1122 Patterson St., Ogden, Utah, and Martin A. Hardin, Ogden, Utah (1790 South 50 West, Bountiful, Utah)
Filed June 24, 1963, Ser. No. 290,031
3 Claims. (Cl. 43—57.5)

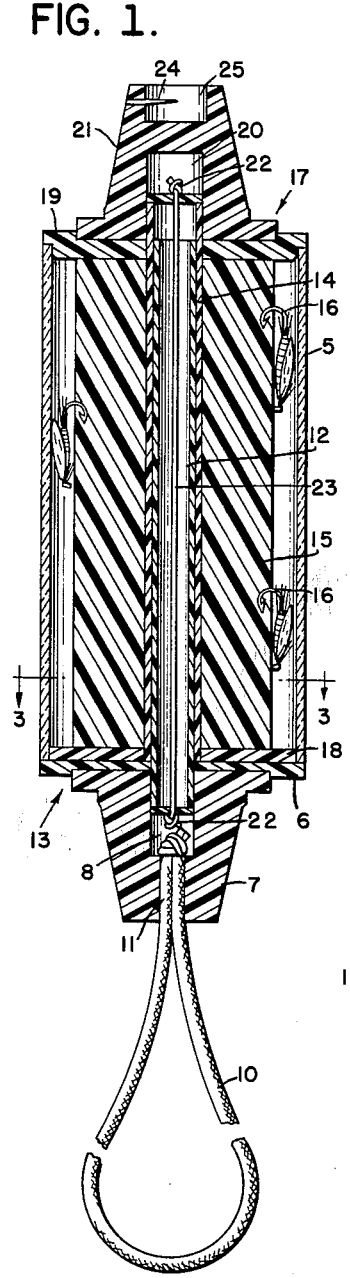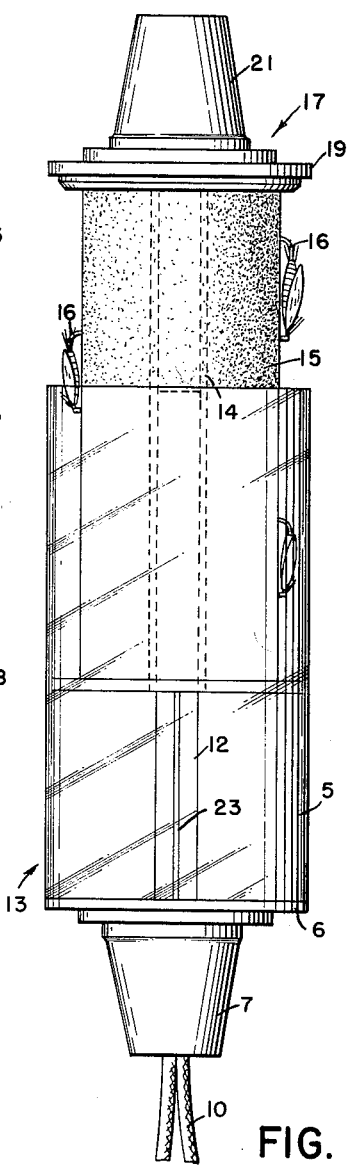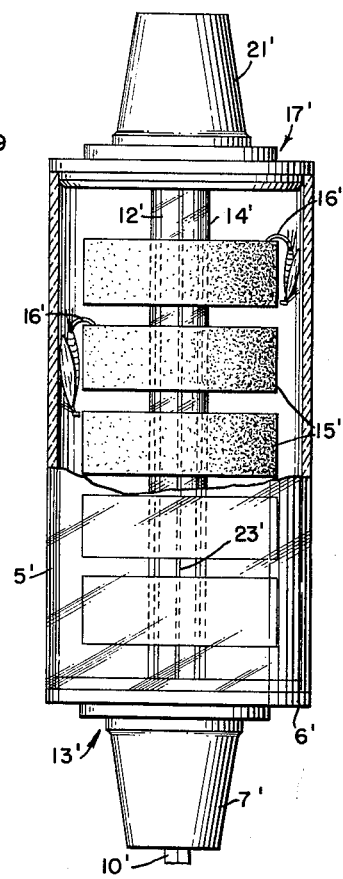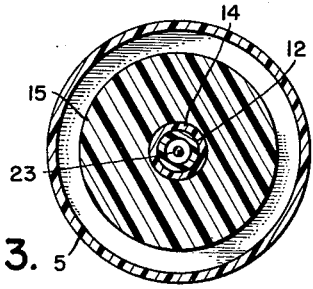

This invention is a holder for artificial flies used in fishing, being an improvement on our U.S. Patent Number 2,693,662, issued November 9, 1954.

The fly holder of our Patent Number 2,693,662 was a recognized advance in the art, but after use and further experiments, covering a period of several years, we have made some improvements and eliminated some objections to our commercial holder.

Objects of this invention are to considerably reduce the number of parts used in our fly holder, resulting in a more economical product, without omitting any of its advantages; to so construct the holder that possibility of stripping the flies from the holder, when the latter is retracted into the holder receptacle is eliminated; to provide a holder, the fly-carrying part of which is a single body, the surface of the body being receptive to hooks of the flies, throughout the length of the body; and to provide a holder guide for said fly holding part with means to prevent lateral displacement thereof until said holding part has cleared the open end of the receptacle.

Other objects of the invention will be manifest from the following description of the present preferred forms of the invention, taken in connection with the accompanying drawings, wherein:

FIG. 1 is a central longitudinal sectional view of a fly holder constructed in accordance with the present invention;

FIG. 2 is a side elevational view of the same, showing the upper end of the holder above the top of the receptacle;

FIG. 3 is a horizontal sectional view taken along the lines 3—3 of FIG. 1, looking in the direction of the arrows; and FIG. 4 is a fragmentary side elevational view of a modified form of fly holder constructed in accordance with the present invention.

The fly holder of this invention comprises a cylindrical transparent receptacle 5, made of glass, plastic or other suitable material. One end 6, of the receptacle is closed and equipped with a finger knob 7, provided with a central recess 8. The recess is adapted, inter alia, for the reception of the knotted ends of a handhold or supporting cable 10. The free ends of the cable are trained through an axial opening 11, in the finger knob 7, prior to forming the knots. One end of a circular tubular guide 12, is anchored in the recess 8 of the finger knob 7. The guide extends axially upwardly through the cylinder 5 and terminates at the upper end of the latter, as shown in FIG. 1. The guide 12 is preferably transparent and made of an inflexible plastic material.

The present invention includes a fly holding entity 13, embodying a core tube 14, a major portion of the periphery of which is covered by a body 15, receptive to fly hooks 16. The body 15 is compact throughout, made of urethane or like material, to the periphery of which the fly hooks are engaged and disengaged with facility. The core tube 14 is carried by the top unit 17 of the entity 13, the lower end of the core tube being secured in a keeper disk 18. The upper end of tube 14 projects through and beyond a closure 19 of unit 17, into a recess 20 in closure knob 21, and is secured to the wall of the recess in any suitable manner. The opposite ends of an elastic cord 23 are held in place as shown in FIG. 1. The upper end of the elastic cord 23 is trained through the upper closed end of the core tube 14 and the other end trained through the closed lower end of the guide 12. Preferably, the free ends of the cord are knotted, as indicated at 22, although they may be secured to the core tube and the guide in any other suitable manner.

When a fly or flies are to be removed from the body 15, upward or downward pressure on one of the knobs 21 or 7, respectively, is exerted. The other knob is held in a fixed position in one hand of the user, until some or all of the flies are accessible at a point above the receptacle. As the cylindrical receptacle 5 is moved longitudinally with respect to the body 15, core tube 14 remains contiguous with inflexible guide 12, so that the transparent receptacle 5 is maintained coaxial with the body 15. When the holder is clear of the top of the receptacle, it may be shifted laterally, so that the keeper plate 18 engages the near extremity of cylindrical receptacle 5. Flies may then be removed or attached. While in this position, the receptacle 5 is held under tension by elastic cord 23.

In FIG. 4 of the drawing, a modified form of the invention is shown, wherein the body 15 is formed of multiple spaced disks 15', made of the same material as the body 15. These disks circumscribe core tube 14', which is sleeved over guide 12' in the same manner as is done in the preferred form of the invention, and are spaced in any suitable manner. The disks 15' are adapted for reception of fly hooks 16', preferably as shown in FIG. 4 of the drawing. An elastic cord 23' serves the same purpose as the elastic cord 23, and is secured to the core tube and guide in the same manner as shown in FIG. 1.

The other parts of the modified form of the invention carry the same numerals, primed, as used in identifying the parts of the preferred form of the invention.

It is also desired to include in the entity, a cleaning pin 24, for cleaning the eyes of fish hooks. The pointed end of the pin 24 is in a recess 25 in the top of the knob 21 and 21'. This is used in the same manner as the cleaning member described in our prior patent.

While preferred forms of the invention have been shown and described, it is nevertheless to be understood that various changes may be made therein, without departing from the spirit and scope of the claims hereto appended.

We claim:

1. A holder for artificial flies used in fishing, including an elongated cylindrical receptacle open at one end and provided with a closure at the other end, a hollow tubular guide secured to the end closure of said cylindrical receptacle, said guide extending axially through the length of said receptacle, a fly-holding entity fitted in said cylindrical receptacle, the entity comprising a core tube provided with an axial bore slightly larger in cross sectional area than said guide, to permit sliding engagement to said entity with respect to said guide to remove the former from the latter, the outer periphery of said core tube being covered with material receptive to fly hooks, the inner periphery of said core tube being in contiguous, sliding relation with the outer periphery of said hollow tubular guide throughout its length, whereby the axis of said core tube will not pivot with respect to the axis of the hollow tubular guide, an end closure fixed to the outer terminal of said core tube, and an elastic cord within said hollow tubular guide, one terminal of said core being fixed to the end closure of said cylindrical receptacle, and the opposite terminal of said cord being fixed to the end closure of said core tube.

2. The holder of claim 1 in which the fly holding entity comprises multiple spaced disks, each receptive to fly hooks, movable on the guide, to permit access to the fly hooks of one or more of the disks at a point beyond the open end of the receptacle.

3. A holder for artificial flies used in fishing including a receptacle open at one end and provided with a closure at the other end, a hollow tubular guide, one end of which is closed and mounted in the closure of the receptacle, a core tube sleeved over the guide, the outer end of the tube extending beyond the guide, the inner periphery of said core tube being in contiguous, sliding relation with the outer periphery of said hollow tubular guide throughout its length, whereby the axis of said core tube will not pivot with respect to the axis of the hollow tubular guide, a closure on the outer end of the tube, a resilient member within the guide, means for securing one end of said resilient member to the closed end of the guide, means for securing the opposite end of the resilient member to the closed end of the tube, to urge the tube into its normal position within the receptacle, and material on said core tube receptive to penetration by fish hooks.

References Cited by the Examiner
UNITED STATES PATENTS

| | | | |
|---|---|---|---|
| 1,896,463 | 2/33 | Offerman | 312—73 |
| 2,252,381 | 8/41 | Ladd | 312—73 |
| 2,629,200 | 2/53 | Woodhead | 43—57.5 |
| 2,675,640 | 4/54 | Adamek | 43—57.5 |
| 2,693,662 | 11/54 | Norton et al. | 43—57.5 |
| 2,802,575 | 8/57 | Harrison | 312—71 X |
| 2,830,399 | 4/58 | Davis | 43—23 |

ABRAHAM G. STONE, *Primary Examiner.*

JOSEPH S. REICH, *Examiner.*